(12) United States Patent
Greenberg et al.

(10) Patent No.: US 10,794,716 B2
(45) Date of Patent: Oct. 6, 2020

(54) SYSTEMS AND METHODS FOR SELECTING A POI TO ASSOCIATE WITH A NAVIGATION MANEUVER

(71) Applicant: GOOGLE LLC, Mountain View, CA (US)

(72) Inventors: Merav Greenberg, Tel-Aviv (IL); Yigal Petreanu, Tel-Aviv (IL); Nir Doron, Tel-Aviv (IL); Karin Elazari, Tel-Aviv (IL)

(73) Assignee: GOOGLE LLC, Mountain View, CA (US)

( * ) Notice: Subject to any disclaimer, the term of this patent is extended or adjusted under 35 U.S.C. 154(b) by 384 days.

(21) Appl. No.: 15/841,684

(22) Filed: Dec. 14, 2017

(65) Prior Publication Data

US 2019/0186933 A1 Jun. 20, 2019

(51) Int. Cl.
*G01C 21/34* (2006.01)
*G01C 21/36* (2006.01)

(52) U.S. Cl.
CPC ..... *G01C 21/3476* (2013.01); *G01C 21/3484* (2013.01); *G01C 21/3644* (2013.01); *G01C 21/3655* (2013.01); *G01C 21/3679* (2013.01)

(58) Field of Classification Search
CPC ............ G01C 21/3476; G01C 21/3484; G01C 21/3644; G01C 21/3655; G01C 21/3679
USPC ........................................................ 701/426
See application file for complete search history.

(56) References Cited

U.S. PATENT DOCUMENTS

| | | |
|---|---|---|
| 2002/0072848 A1 | 6/2002 | Hamada et al. |
| 2004/0030493 A1* | 2/2004 | Pechatnikov .......... G01C 21/32 701/411 |
| 2006/0293993 A1 | 12/2006 | Dale |
| 2010/0250126 A1 | 9/2010 | Epshtein et al. |
| 2011/0040626 A1 | 2/2011 | Lin |

(Continued)

FOREIGN PATENT DOCUMENTS

WO WO-2010/076045 A1 7/2010

OTHER PUBLICATIONS

International Search Report and Written Opinion for Application No. PCT/US2018/065157, dated Mar. 29, 2017.

(Continued)

*Primary Examiner* — Gertrude Arthur Jeanglaude
(74) *Attorney, Agent, or Firm* — Marshall, Gerstein & Borun LLP (57) ABSTRACT

Systems and methods are provided for selecting points of interest (POIs) to include in navigation maneuvers presented by a navigation application of an electronic device. Navigation directions, including several maneuvers, are generated by a server device. Candidate POIs near locations corresponding to each of the maneuvers are identified and the server device receives requests from third parties that own each of the candidate POIs. The server device selects one of the candidate POIs for each maneuver based on the requests from the third parties and additionally based on the visibility of each of the candidate POIs from the location of the maneuver or the distance between the location of each of the candidate POIs and the location of the maneuver. The server device provides the navigation directions, including an indication of the selected POI for a corresponding maneuver, to the client device of the user who requested the navigation directions.

20 Claims, 6 Drawing Sheets

(56) References Cited

U.S. PATENT DOCUMENTS

| | | |
|---|---|---|
| 2013/0173154 A1 | 7/2013 | Wither et al. |
| 2013/0245944 A1 | 9/2013 | Rutten et al. |
| 2013/0253831 A1 | 9/2013 | Langendorff |
| 2016/0334228 A1 | 11/2016 | Wang |
| 2016/0358471 A1* | 12/2016 | Hajj .................. G01C 21/3423 |
| 2017/0314954 A1 | 11/2017 | Golding et al. |

OTHER PUBLICATIONS

Examination Report for European Application No. 18836971.4, dated Jul. 8, 2020.

* cited by examiner

SYSTEMS AND METHODS FOR SELECTING A POI TO ASSOCIATE WITH A NAVIGATION MANEUVER

FIELD OF THE DISCLOSURE

The present disclosure generally relates to selecting a point of interest to include in a navigation maneuver presented by a navigation application of an electronic device.

BACKGROUND

Today, software applications executing in computers, smartphones, etc. or embedded devices generate step-by-step navigation directions. Typically, a user specifies the starting point and the destination, and a software application displays the directions immediately and/or as the user travels from the starting point and the destination. In some cases, the software applications also produce voice announcements corresponding to the navigation directions.

These navigation applications typically provide navigation directions to users through a series of maneuvers using streets as reference points, e.g., "turn right at Main Street." However, in some instances (e.g., when street signs are missing or poorly marked, when visibility is bad at night or during a storm, at a six-way intersection, etc.), a user may be unable to identify the indicated street in time to perform the maneuver.

SUMMARY

In one aspect, a computer-implemented method for selecting a point of interest to include in a maneuver is provided. The method includes generating navigation directions for a user of a client device, the navigation directions including a plurality of maneuvers, identifying a plurality of points of interest near a location corresponding to one of the plurality of maneuvers, and receiving requests from a plurality of third parties, each request related to a respective one of the plurality of points of interest. The method also includes selecting a point of interest from among the plurality of points of interest near the location corresponding to the maneuver using: the requests from the plurality of third parties, and at least one of: a visibility of each of the points of interest from the location of the maneuver, or a distance between a location of each of the points of interest and the location of the maneuver. Moreover, the method includes providing the navigation directions including the plurality of maneuvers to the client device, the maneuver of the plurality of maneuvers including an indication of the selected point of interest.

In another aspect, a server device is provided including one or more processors and a non-transitory computer-readable memory storing instructions thereon. The instructions, when executed by the one or more processors, cause the server device to generate navigation directions for a user of a client device, the navigation directions including a plurality of maneuvers; identify a plurality of points of interest near a location corresponding to one of the plurality of maneuvers; and receive requests from a plurality of third parties, each request related to a respective one of the plurality of points of interest. The instructions further cause the server device to select a point of interest from among the plurality of points of interest near the location corresponding to the maneuver using: the requests from the plurality of third parties, and at least one of: a visibility of each of the points of interest from the location of the maneuver, or a distance between a location of each of the points of interest and the location of the maneuver. Moreover, the instructions cause the server device to provide the navigation directions including the plurality of maneuvers to the client device, the maneuver of the plurality of maneuvers including an indication of the selected point of interest.

In yet another aspect, a non-transitory computer-readable medium stores instructions for selecting a point of interest to include in a maneuver. When executed by one or more processors in a computing device, the instructions cause the one or more processors to generate navigation directions for a user of a client device, the navigation directions including a plurality of maneuvers, identify a plurality of points of interest near a location corresponding to one of the plurality of maneuvers, and receive requests from a plurality of third parties, each request related to a respective one of the plurality of points of interest. The instructions further cause the one or more processors to select a point of interest from among the plurality of points of interest near the location corresponding to the maneuver using: the requests from the plurality of third parties, and at least one of: a visibility of each of the points of interest from the location of the maneuver, or a distance between a location of each of the points of interest and the location of the maneuver. Moreover, the instructions cause the one or more processors to provide the navigation directions including the plurality of maneuvers to the client device, the maneuver of the plurality of maneuvers including an indication of the selected point of interest.

DETAILED DESCRIPTION

Overview

In the present disclosure, systems and methods are provided for generating navigation directions for display via a navigation application executing on an electronic device. Maneuvers included in the navigation directions may include a point of interest (POI) located near the maneuver. For instance, the navigation directions may include an instruction for the user to make a turn near a given POI (e.g., "Turn right at Jane's Restaurant.") In particular, when several POIs are located near an intersection (e.g., two restaurants and a gas station), a particular POI must be selected as a reference point for a maneuver at that intersection.

As one example, a POI may be selected based on a third party associated with the POI (e.g., the owner of the restaurant or gas station). For example, a third party associated with a particular POI may request that the particular POI be selected at a given intersection. If multiple third parties request for their associated POIs to be selected at the same intersection, their requests may be compared to determine which POI will be selected as a reference point for a maneuver at that intersection. In some instances, third parties may bid on the right to be associated with a popular intersection in the context of the navigation directions. The POI may also be selected using additional factors, such as the distance between the POI and the location of the maneuver, the visibility of the POI from the location of the maneuver, any suitable combination of these, or other suitable factors ensuring that the user can identify the POI in order to make the maneuver.

In some embodiments, each of several candidate POIs for a particular maneuver may be ranked using a scoring system that assigns scores based on the bid received for the POI, the distance between the POI and the location of the maneuver, and the visibility of the POI from the location of the maneuver. Each of these scores may be weighted, combined, and/or aggregated in any suitable manner. For example, the bid received score may be weighted the highest. Then the POIs may be ranked in order of their corresponding scores and the highest ranked POI may be selected for the maneuver. The selected POI then may be included in the location component of the maneuver and may be presented to the user requesting the navigation directions as the user approaches the selected POI. In some embodiments, the navigation application presents audio associated with the third party that owns the selected POI such as a restaurant's jingle, an image associated with the third party that owns the selected POI such as the restaurant's logo, a phrase associated with the third party that owns the selected POI such as "Home of the best burger in town!" a video associated with the third party that owns the selected POI such as a video advertisement for the restaurant, or any other suitable information associated with the selected POI. In some embodiments, the navigation directions do not include more than a threshold number of POIs in the respective maneuvers.

Generally speaking, techniques for selecting a POI to include in a maneuver within a set of navigation directions can be implemented in a navigation application executed on an electronic device (also referred to herein as a "client device"), one or several network servers, or a system that includes a combination of these devices. However, for clarity, the examples below focus primarily on an embodiment in which a user requests navigation directions via a navigation application on an electronic device. The navigation application transmits the request to a navigation server and/or a third party request server which communicate with each other to generate a set of navigation directions having several maneuvers. Each maneuver includes a location component used as a reference point for performing the maneuver. In some embodiments, the navigation server and/or the third party request server may identify a POI as the location component instead of a street name or address, intersection, or set of geographic coordinates for some of the maneuvers.

When several candidate POIs may be used as the location component, the third party request server may select one of the candidate POIs by for example, ranking the candidate POIs according to several factors, such as a bid received for each of the candidate POIs, the distance between each candidate POI and the location of the maneuver, and the visibility of each candidate POI from the location of the maneuver. In some embodiments, the third-party request server provides the selected POI to the navigation server which replaces the location component of the maneuver with the selected POI. The navigation server and/or the third-party request server may then provide the set of navigation directions including the selected POI to the electronic display to navigate the user to her destination.

Advantageously, navigation directions that include a POI as a reference point for a maneuver are safer and more informative than typical navigation directions that use only streets as reference points. That is, when a user follows navigation directions that use only streets as reference points for maneuvers, e.g., "turn right at Main Street," there may be instances in which a user may be unable to identify the indicated street, such as when street signs are small, missing, or poorly marked, when visibility is poor (at night, during a storm, etc.) at a six-way intersection, etc. In such instances, a user may be distracted from the road while attempting to identify a street sign, which may lead to unsafe driving. In contrast, when a user follows navigation directions that include a POI such as a shop or restaurant as a reference point for a maneuver, a user will likely easily locate the POI. In this way, navigation directions that include a POI as a reference point reduce the likelihood that a user will be distracted when looking for a turn.

Moreover, navigation directions that include a POI as a reference point for a maneuver may be easier to understand for users accustomed to receiving navigations verbally from other people. That is, when people give each another directions verbally, they often include a POI rather than, or in addition to a street name (e.g., "turn right at Jane's Restaurant," or "turn right on Main Street, just past Jane's Restaurant."). Accordingly, navigation directions that include a POI as a reference point for a maneuver may sound more familiar and less robotic to users than typical navigation directions that include only streets as reference points, and may create a more comfortable experience for users.

Example Computing Environment

Figure 1:
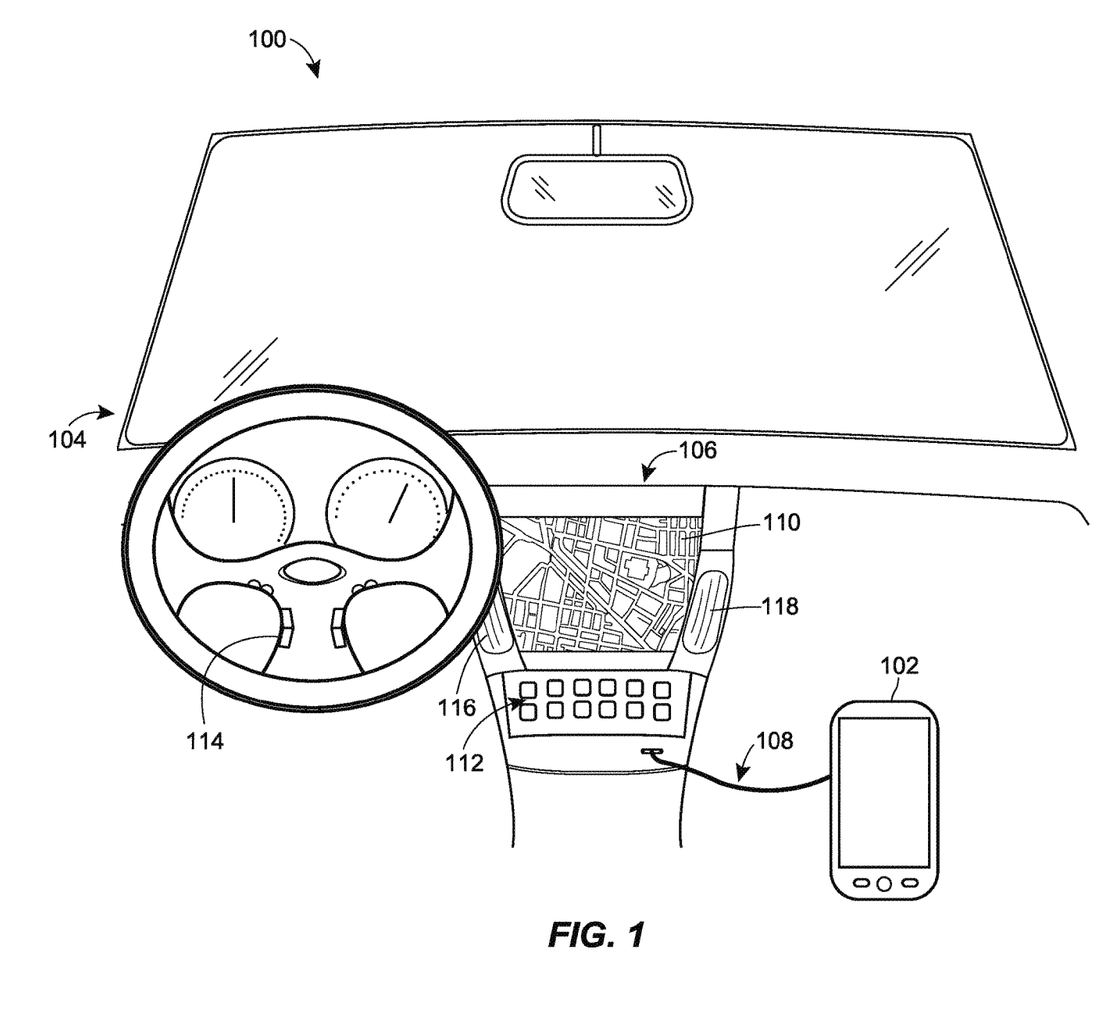
FIG. 1 illustrates an example environment in which the techniques of the present disclosure can be used to select a point of interest to include in a navigation maneuver presented by a navigation application executing on an electronic device.

Referring to FIG. 1, an example environment 100 in which the techniques outlined above can be implemented includes an electronic device 102 and a vehicle 104 with a head unit 106. The electronic device 102 may be a smart phone, tablet computer, wearable computer, etc. The electronic device 102 communicates with the head unit 106 of the vehicle 104 via a communication link 108, which may be wired (e.g., Universal Serial Bus (USB)) or wireless (e.g., Bluetooth, Wi-Fi Direct). The electronic device 102 also can communicate with various content providers, servers, etc. via a wireless communication network.

In operation, the electronic device 102 obtains navigation data to navigate the user from an origin location to a destination location in the form of a sequence of navigation instructions or maneuvers. As discussed in more detail below, the electronic device 102 can receive navigation data via a communication network from a navigation service or can generate navigation data locally, depending on the implementation. In some implementations, the electronic device 102 provides the head unit 106 with information related to navigation, which may include digital map images, text, and audio. The head unit 106 displays this information via a display 110. The display 110 in some implementations is a touchscreen and includes a software keyboard for entering text input, which may include the name or address of a destination, point of origin, etc. Another type of the display 110 can be a screen provided along with a non-touch input device, such as a rotary controller, for example, or a separate touch pad. In general, the display 110 need not be capable of displaying both text and images. A head unit in another vehicle can include, for example, a simple display only capable of displaying alphanumeric characters on one or several lines.

The head unit 106 can include hardware input controls such as buttons, knobs, etc. These controls can be disposed on the head unit 106 or elsewhere in the vehicle 104. For example, the vehicle 104 in FIG. 1 includes navigation controls 112 on the head unit 106 as well as steering wheel controls 114 communicatively coupled to the head unit 106. The controls 112 and 114 can be mapped to a variety of navigation control functions on the electronic device 102. The controls 112 and 114 in some implementations also can be used for entering alphanumeric characters or to perform other functions for requesting navigation directions.

The vehicle 104 can also include audio input and output components, such as a microphone 116 and a speaker 118. The microphone 116 may be configured to capture voice input from a user, while the speaker 118 may be configured to communicate navigation-related information with the user. Similar to the hardware controls 112 and 114, the microphone 116 and speaker 118 can be disposed directly on the head unit 106 or elsewhere in the vehicle 104.

An example implementation of the electronic device 102 is illustrated with reference to FIG. 2. The electronic device 102 may include one or more processors 120 coupled to a memory 122, a GPS unit 124, a display 126 such as a touchscreen, one or more sensors 128 (e.g., an accelerometer, a gyroscope, an inertial measurement unit (IMU), a speedometer), one or more audio input components 130, one or more audio output components 132, and one or more communication units 134. The communication units 134 may include a short range communication unit for communicating with the head unit 106, as well as a long range communication unit. The short range communication unit may support one or more communication schemes such as USB, Bluetooth, Wi-Fi Direct, etc., while the long range communication unit may transmit and receive data via a suitable wireless network 136, such as, e.g., a 3G cellular network or a 4G cellular network. Each of the one or more processors 120 can be any suitable general-purpose processing unit (e.g., a CPU), a microprocessor, or an application-specific processing unit. The memory 122 can be a non-transitory computer-readable medium that can include persistent components such as a hard disk, a flash drive, etc. and non-persistent components such as a random access memory (RAM) unit. The processor(s) 120 and the memory 122 can be interconnected via a suitable electrical connection such as a digital bus, for example.

Using the communication units 134, the electronic device 102 may communicate with any number of suitable servers. In the example configuration of FIG. 2, the electronic device 102 communicates with a navigation server 138 that provides navigation data as well as a third party request server 140 that provides third party request data. The navigation server 138 may include a processor 142 and a memory 144, and may be configured to access a navigation database 146 storing navigation data and/or a map database storing map data. The third party request server 140 may include a processor 148 and a memory 150, and may be configured to access a third party requestor database 152 storing third party request data. The third party request data may include bids from third parties associated with the POIs, visibility information indicating the amount of visibility for each POI from a corresponding intersection or location for a maneuver, a set of rules for scoring each of the POIs, etc.

In some embodiments, the visibility information is obtained from crowd-sourced data provided by electronic device users executing the navigation application. For example, a user, or any number of volunteers, developers, administrators, etc., may rate the visibility of a POI from a particular intersection or location, may provide a review related to the visibility of the POI from the particular intersection or location, or may provide any other suitable information related to the visibility of the POI from the particular intersection or location using the navigation application. The reviews, or other information may include, for instance, suggestions for an alternative POI to be associated with a particular intersection, or a correction regarding the POI as it appears in the navigation directions. The navigation application may then transmit the visibility information and/or corrected POI information to the third party request server 140.

While the navigation server 138 and the third party request server 140 are illustrated as separate servers, the navigation server 138 and the third party request server 140 may be included within the same server device.

Figure 2:
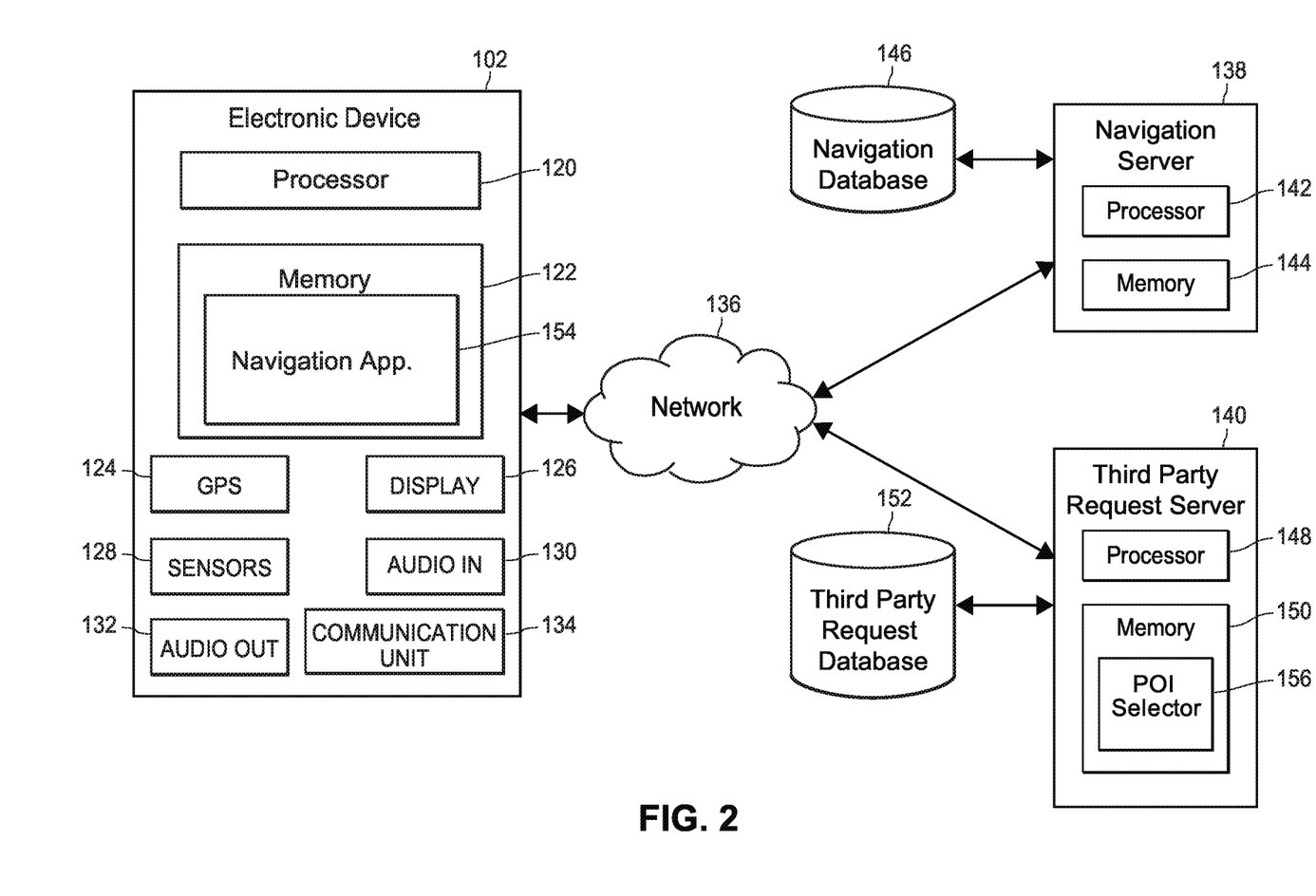
FIG. 2 is a block diagram of an example electronic device that can operate in the system of FIG. 1.

As illustrated in FIG. 2, the memory 122 of the electronic device 102 stores a navigation application 154. The navigation application 154 can include compiled instructions and/or instructions in any suitable programmable language interpretable at runtime, and executable on the one or more processors 120. Generally, the navigation application generates, or receives from the navigation server 138, a route directing a driver from the current location or another starting location to a destination that the user has selected. As one example, the route can include a sequence of steps or maneuvers each having several components. The components within a maneuver may include a route segment component (e.g., a name or number of the road, a distance, a travel time, a speed limit, etc.), an action component, (e.g., turn left, merge right, etc.) to access the next route segment, and a location component which may be a POI used as a reference point for performing the maneuver (e.g., turn left at Cindy's Donuts).

In particular, the navigation application 154 may communicate with a POI selector 156 that operates on one or more network servers (the navigation server 138 and/or the third party request server 140). Alternatively, the POI selector 156 is part of the navigation application 154 or is implemented as an independent task executing on the electronic device 102 separately from the navigation application 154. In yet another implementation, the POI selector 156 operates on a combination of the electronic device 102 and the servers.

In any case, the POI selector 156 is configured to identify several candidate POIs near a location corresponding to one of the maneuvers generated by the navigation server 138, receive requests from third parties that own the candidate POIs (e.g., from the third party request server 140 and/or the third party request database 152), and select a POI corresponding to the maneuver based on the requests from the third parties, the visibility of each of the POIs from the location of the maneuver, and/or the distance between a location of each of the POIs and the location of the maneuver. The navigation server 138 and/or the third party request server 140 may then include the selected POI in the corresponding maneuver within the set of navigation directions and provide the set of navigation directions to the navigation application 154. Accordingly, the navigation application 154 may present the navigation directions to the user, where one of the maneuvers includes an indication of the selected POI (e.g., turn left at Cindy's Donuts).

More specifically, to select a POI for a particular maneuver the navigation server 138 may identify a set of candidate POIs within a threshold distance of the intersection or location for the maneuver and provide the set of candidate POIs to the POI selector 156. The POI selector 156 may then obtain third party request data for each of the candidate POIs from the third party request database 152. In some embodiments, the POI selector 156 ranks each of the candidate POIs for a particular maneuver and selects the highest ranking candidate POI as the POI to include in the maneuver. For example, the POI selector 156 may assign a received bid score to each of the candidate POIs based on the bid received for the respective POI. The POI selector 156 may also assign a distance score to each of the candidate POIs based on the distance between the respective POI and the location of the maneuver. Additionally, the POI selector 156 may assign a visibility score to each of the candidate POIs based on the visibility of the POI from the location of the maneuver. Moreover, the POI selector 156 may assign additional or alternative scores to each of the candidate POIs such as user specific scores based on indicated user preferences provided by the user. The user preferences are provided after receiving permission from the user. For example, the navigation application 154 may include user controls for entering preferred POIs and for permitting the navigation application 154 to send the preferred POIs to the servers.

In any event, each of the scores for the candidate POIs may be weighted, combined, and/or aggregated in any suitable manner to generate an overall score for each of the candidate POIs. For example, the bid received score may be weighted the highest. Then the candidate POIs may be ranked in order of their corresponding scores and the highest ranked candidate POI may be selected for the maneuver. In some embodiments, users, volunteers, developers, administrators, etc. may adjust the rankings to ensure that the optimal POI is selected for a maneuver. For example, when a user identifies that a particular POI is difficult to see from an intersection for a maneuver, the user may be able to lower the POI in the rankings so that another POI is selected.

As mentioned above, in some embodiments, a set of navigation directions may not include more than a threshold number of POIs in the respective maneuvers. Accordingly, the POI selector 156 may select a POI for each maneuver in the set of navigation directions until the threshold number has been reached and then may stop selecting POIs. Then a street name or address, intersection, or set of geographic coordinates may be used as the location component for the remaining maneuvers. In other embodiments, the POI selector 156 selects a POI for each of the maneuvers in the set of navigation directions. Then the POI selector 156 ranks the selected POIs according to their respective overall scores and identifies the highest ranking selected POIs up to the threshold number. The POIs ranked below the threshold number may be filtered out and the highest ranking selected POIs may be included in the corresponding maneuvers while a street name or address, intersection, or set of geographic coordinates may be used as the location component for the remaining maneuvers.

Also in some embodiments, the POI selector 156 may select a POI in between maneuvers, for example when two consecutive maneuvers are separated by more than a threshold distance (e.g., 10 miles). In this manner, the user may continue to receive instructions from the navigation application 154 when the user does not have a maneuver to perform for several miles. For example, the user may be travelling on a highway for 50 miles before reaching the exit. Accordingly, the navigation application 154 may include an additional instruction which may not require an action, such as "continue straight" and may include a selected POI as the location component. In some embodiments, the POI selector 156 or the navigation server 138 may identify a location or a geographic area for the additional instruction, such as the midpoint between the two consecutive maneuvers, a location that the user is expected to approach after travelling for half of the estimated time period between the two consecutive maneuvers, the geographic area along the route between the two consecutive maneuvers, or any other suitable location and may identify several candidate POIs within a threshold distance of the identified location or geographic area. Then the POI selector 156 may select a POI from the candidate POIs in a similar manner as described above.

Example User Interfaces Presented by the Navigation Application

Figure 3A:
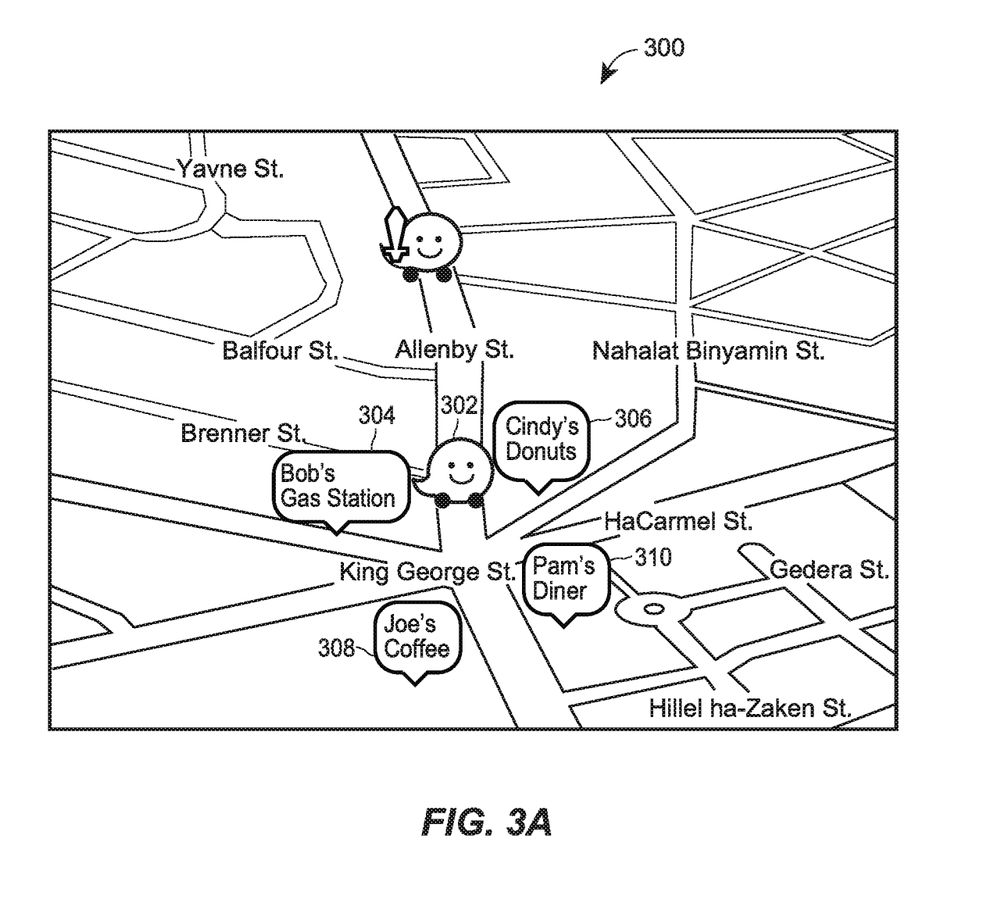
FIGS. 3A-3C illustrate example user interfaces for displaying navigation directions to a user of a navigation application executing on an electronic device.
Figure 3B:
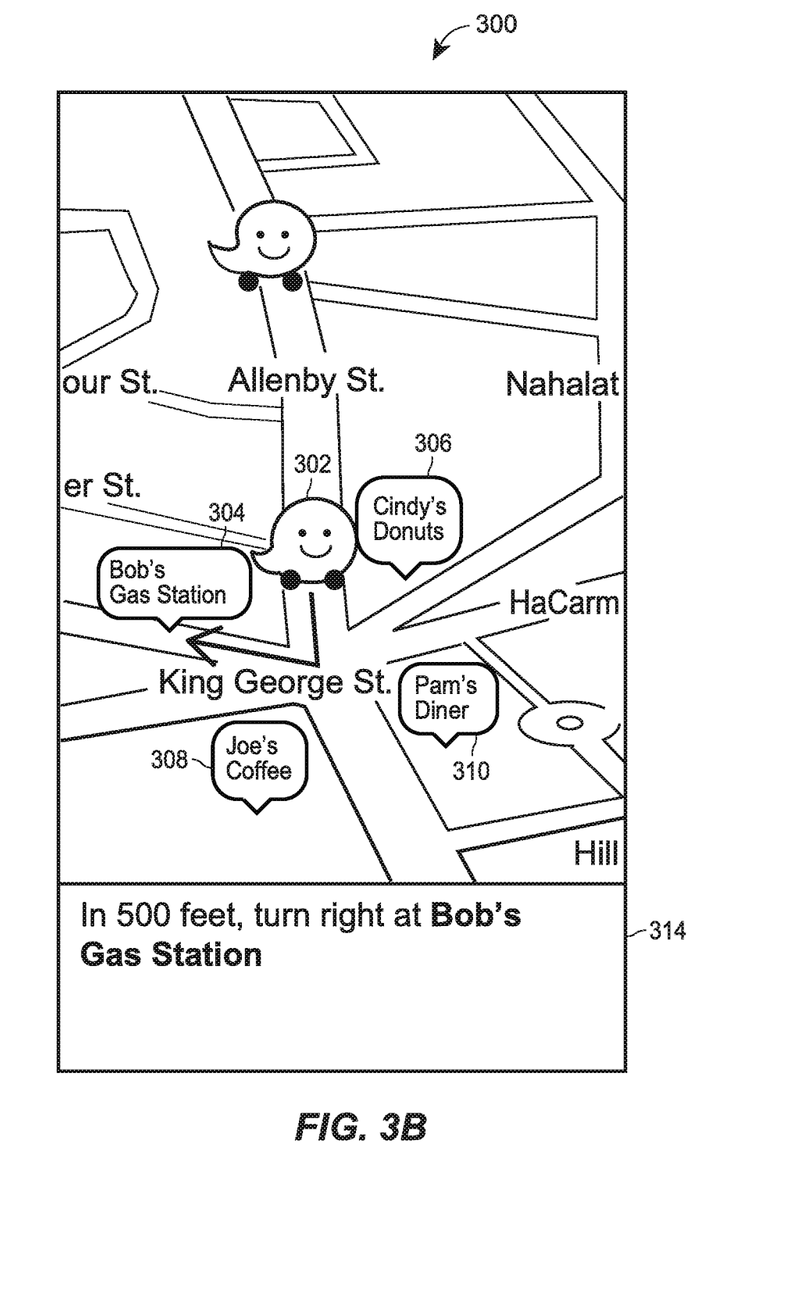
Figure 3C:
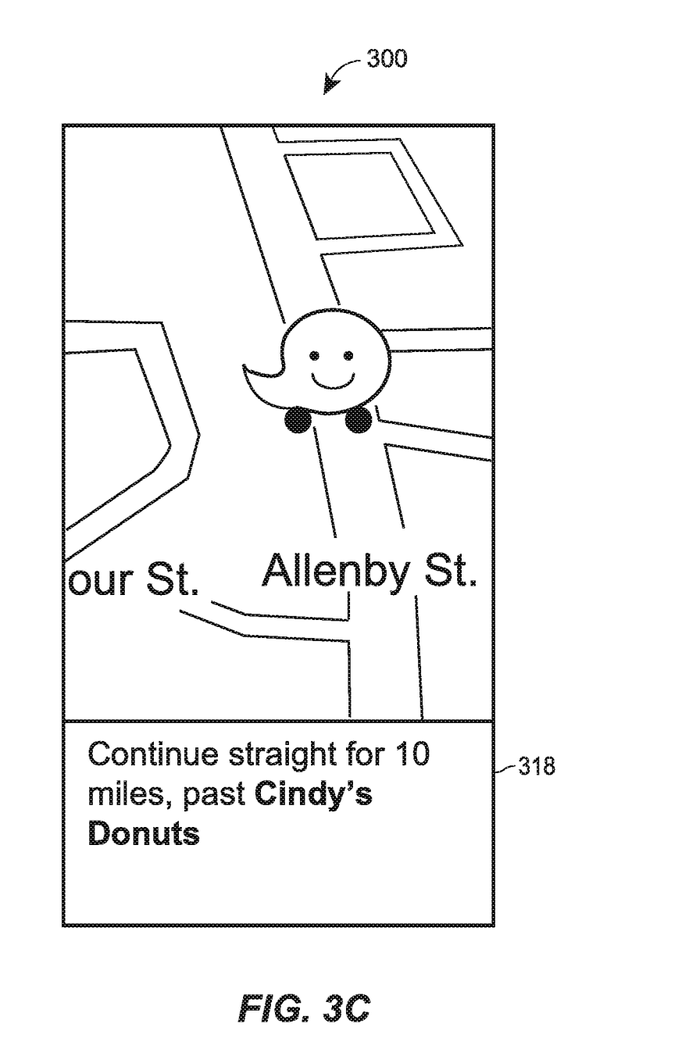

FIGS. 3A-3C illustrate example user interfaces 300 for displaying navigation directions for a user of a navigation application of an electronic device in accordance with the systems and methods disclosed herein. In the example display shown in FIG. 3A, the user interface 300 includes a map display and a representation of a vehicle 302 associated with a user traveling toward the intersection of Allenby Street, King George Street, and HaCarmel Street. For example, the map data for the map display may be provided by the navigation server 138 to the electronic device 102. The map display includes several POIs at the intersection: Bob's Gas Station 304, Cindy's Donuts 306, Joe's Coffee 308, and Pam's Diner 310.

In the example display shown in FIG. 3B, the user requests navigation directions that include a maneuver at the intersection (a right turn). In this example, the POI selector 156 identifies each of Bob's Gas Station 304, Cindy's Donuts 306, Joe's Coffee 308, and Pam's Diner 310 as candidate POIs for the maneuver. The candidate POIs are then ranked according to the bids received for each of the POIs, the distance between each of POIs and the intersection of Allenby Street, King George Street, and HaCarmel Street, and the visibility of each of the POIs from the intersection. In an exemplary scenario, the owner of Bob's Gas Station 304 submits a higher bid than the owners of Cindy's Donuts 306, Joe's Coffee 308, and Pam's Diner 310. Each of the candidate POIs are about the same distance from the intersection and the navigation server 138 and/or third party request server 140 have not received any reports regarding the visibility of the candidate POIs from the intersection. Accordingly, Bob's Gas Station 304 is ranked highest and selected as the POI. As a result, the user is provided with a navigation direction 314 instructing the user to turn right at Bob's Gas Station 304.

In another instance, as shown in FIG. 3C, a user of a second vehicle 316 receives navigation directions, where two consecutive maneuvers are separated by more than a threshold distance (e.g., 10 miles). Accordingly, the navigation server 138 and/or the third party request server 140 provides an additional instruction, such as "continue straight" and includes a selected POI as the location component. As mentioned above, the POI may be selected by identifying a location or a geographic area for the additional instruction, such as the midpoint between the two consecutive maneuvers, a location that the user is expected to approach after travelling for half of the estimated time period between the two consecutive maneuvers, the geographic area along the route between the two consecutive maneuvers, or any other suitable location. The POI selector 156 may then identify several candidate POIs within a threshold distance of the identified location or geographic area and select one of the candidate POIs, such as the highest ranking or scoring POI. Here, the selected POI is Cindy's Donuts 306 and the user is provided with an additional instruction 318 to continue straight past Cindy's Donuts 306.

Figure 4:
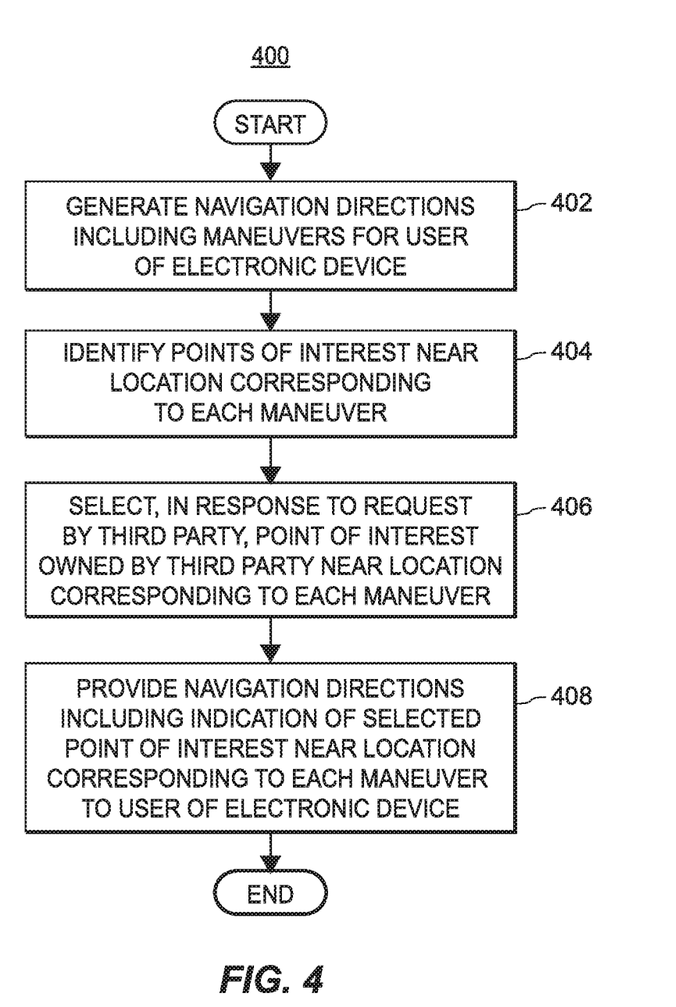
FIG. 4 is a flow diagram of an example method for selecting a point of interest to include in a navigation maneuver presented by a navigation application executing on an electronic device.

Now referring to FIG. 4, an example method 400 for selecting a POI to include in a navigation maneuver may be implemented by a POI selector 156 in a third party request server 140 or a navigation server 138. The method 400 can be implemented as a set of instructions stored on a computer-readable memory 150 and executable on one or more processors 148 of the third party request server 140 or another suitable computing system.

At block 402, navigation directions may be generated for a user (such as an operator or passenger of a vehicle 104) of an electronic device 102. For example, the navigation directions may be generated in response to a request from the electronic device 102 to provide navigation directions to a destination selected by the user. The navigation directions may include a route directing a driver from the current location to the destination. The route can include a sequence of steps or maneuvers each having several components. The components within a maneuver may include a route segment component (e.g., a name or number of the road, a distance, a travel time, a speed limit, etc.), an action component, (e.g., turn left, merge right, etc.) to access the next route segment, and a location component which may be a POI used as a reference point for performing the maneuver (e.g., turn left at Cindy's Donuts).

At block 404, several candidate POIs may be identified within a threshold distance of the location corresponding to each maneuver. POIs may include, for example, restaurants, retail stores, entertainment venues, bars, businesses, etc. Each POI may be owned by or otherwise associated with a third party or requestor that requests the POI be associated with an intersection or location corresponding to a maneuver. For example, near a location corresponding to a given maneuver, there may be a first POI requested by a first requestor, a second POI requested by a second requestor, a third POI requested by a third requestor, etc. In an exemplary scenario, the generated navigation directions include a turn from Main Street onto First Street. Alex and David own restaurants near the intersection of Main Street and First Street, while Bill owns a retail store near the intersection of Main Street and First Street, and Carly owns a bar near the intersection of Main Street and First Street.

In some instances, the POI selector 156 may identify candidate POIs near the location corresponding to each maneuver by accessing a POI database including location data for several POIs and calculating a distance between the location of each POI and the location of a maneuver. For a given maneuver, the POIs within a threshold distance of the location corresponding to the maneuver may be identified as candidate POIs. Additionally or alternatively, image data associated with the location corresponding to the maneuver (e.g., accessed via a database, or captured via image sensors associated with the electronic device or the vehicle) may be analyzed to identify candidate POIs. Furthermore, candidate POIs for each maneuver may be identified in any suitable manner.

At block 406, the POI selector 156 may select one of the candidate POIs to include in the maneuver. While there may be multiple candidate POIs near an intersection for performing the maneuver, one particular POI may be selected as a reference point for the maneuver (e.g., "turn left at Alex's restaurant;" "turn right at Bill's retail store;" or "turn left at Carly's bar.") The POI may be selected based on several factors such as requests for the candidate POIs from third parties, the visibility of the candidate POIs from the location of the maneuver, the distance between the location of each candidate POI and the location of the maneuver, etc.

To select a POI from the candidate POIs, the POI selector 156 may compare requests (e.g., accessed from the third party request server 140 or third party request database 152) made by the first requestor that provides a request for the first POI, the second requestor that provides a request for the second POI, and the third requestors that provides a request for the third POI. The owner of a particular POI (or requestor who provides a request or bid for the particular POI) may wish to have his or her POI associated with a particular intersection in navigation directions provided by electronic devices, and may accordingly request that his or her POI be associated with the intersection. For example, Alex may want his restaurant to be associated with the popular intersection at First Street and Main Street in order to increase user awareness of his restaurant and gain customers. Similarly, David may want his competing restaurant to be associated with the intersection instead of Alex's restaurant. Accordingly, Alex and David's respective requests may be compared during the selection process. The comparison may include comparing offers made by the third parties. For example, Alex may place a bid amount on the intersection, David may also place a competing bid amount on the intersection, and the POI for the higher bidder may be associated with the intersection in the navigation directions.

The selection process may additionally or alternatively include comparing the visibility of each of the candidate POIs from the location of the maneuver and/or comparing the distance between the location of each candidate POI and the location of the maneuver. For example, if Alex's restaurant is obscured by trees from the perspective of a vehicle operator at the intersection of First Street and Main Street, while David's restaurant is plainly visible to the same vehicle operator, David's restaurant may be more likely to be associated with the intersection than Alex's restaurant. As another example, if David's restaurant is closed and turns its lights off at the time the user is expected to make the maneuver, while Alex's restaurant will be open with the lights on, Alex's restaurant may be more likely to be associated with the intersection than David's restaurant due to higher visibility. As yet another example, if Alex's restaurant is physically closer to the intersection than David's restaurant, or closer to the road onto which the user is instructed to turn than David's restaurant, Alex's restaurant may be more likely to be associated with the intersection than David's restaurant.

As mentioned above, the POI selector 156 may assign scores to each candidate POI, such as a received bid score, a distance score, a visibility score, etc., and weight, combine, or aggregate the assigned scores in any suitable manner to generate an overall score for each of the candidate POIs. The candidate POIs may then be ranked according to their respective scores and the highest ranking POI may be selected as the POI to include in the maneuver.

The POI selector 156 may identify a POI for each maneuver within the set of navigation directions. In some embodiments, a set of navigation directions may not include more than a threshold number of POIs in the respective maneuvers. For example, the set of navigation directions may not include more than three maneuvers associated with POIs in a one-hour drive, more than ten maneuvers associated with POIs in a 100-mile drive, more than M maneuvers associated with POIs in an N minute or N mile drive, etc. Additionally, in some embodiments a user may select the ratio of maneuvers associated with POIs to time or length of drive. Accordingly, the POI selector 156 may select a POI for each maneuver in the set of navigation directions until the threshold number has been reached and then may stop selecting POIs. A street name or address, intersection, or set of geographic coordinates may be used as the location component for the remaining maneuvers. In other embodiments, the POI selector 156 selects a POI for each of the maneuvers in the set of navigation directions. Then the POI selector 156 ranks the selected POIs according to their respective overall scores and identifies the highest ranking selected POIs up to the threshold number. The POIs ranked below the threshold number may be filtered out and the highest ranking selected POIs may be included in the corresponding maneuvers.

At block 408, the navigation directions may be provided to the electronic device 102 and more specifically, the navigation application 154 for display to the user. For at least some of the maneuvers, the navigation directions include an indication of the selected POI. For example, a maneuver may be "Turn left at Alex's restaurant." In addition to a text indication of the selected POI, the indication may additionally include a message from the third party that owns or is otherwise associated with the POI. For example, the message may include an image associated with the third party (e.g., Alex's restaurant's logo), a video associated with the third party (e.g., a video advertisement for Alex's restaurant), a sound associated with the third party (e.g., Alex's restaurant's jingle), a phrase associated with the third party (e.g., "Turn right at Alex's restaurant. Home of the best burger in town!"), etc. In some embodiments, however, a user may make a selection indicating that he or she does not prefer navigation directions to include POIs. In such embodiments, the navigation directions will not include indications of POIs.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for establishing communication sessions related to navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for selecting a point of interest to include in a maneuver, the method comprising:
   generating, by one or more processors, navigation directions for a user of a client device, the navigation directions including a plurality of maneuvers;
   identifying, by the one or more processors, a plurality of points of interest near a location corresponding to one of the plurality of maneuvers;
   receiving, by the one or more processors, requests from a plurality of third parties, each request related to a respective one of the plurality of points of interest;
   selecting, by the one or more processors, a point of interest from among the plurality of points of interest near the location corresponding to the maneuver using:
      the requests from the plurality of third parties; and
      at least one of: a visibility of each of the points of interest from the location of the maneuver, or a distance between a location of each of the points of interest and the location of the maneuver; and
   providing, by the one or more processors, the navigation directions including the plurality of maneuvers to the client device, the maneuver of the plurality of maneuvers including an indication of the selected point of interest.

2. The method of claim 1, wherein the plurality of third parties includes a first requestor that provides a request related to a first point of interest from among the plurality of points of interest, and a second requestor that provides a request related to a second point of interest from among the plurality of points of interest, and wherein selecting the point of interest from among the plurality of points of interest further comprises:
  comparing, by the one or more processors, a first bid amount made by the first requestor and a second bid amount made by the second requestor; and
  selecting, by the one or more processors, one of the first requestor and the second requestor based on the first and second bid amounts.

3. The method of claim 1, further comprising:
  for each of the plurality of maneuvers, identifying a plurality of points of interest near a location corresponding to the maneuver and selecting a point of interest from among the plurality of points of interest;
  determining, by the one or more processors, whether the navigation directions include a threshold number of selected points of interest; and
  when the navigation directions include the threshold number of selected points of interest, not including another indication of a selected point of interest in the navigation directions.

4. The method of claim 1, wherein the plurality of points of interest are a plurality of first points of interest and further comprising:
  identifying, by the one or more processors, a plurality of second points of interest near a location on a route corresponding to the navigation directions that is in between two of the plurality of maneuvers;
  selecting, by the one or more processors, a second point of interest from among the plurality of second points of interest; and
  providing, by the one or more processors, the navigation directions including an indication of the selected second point of interest.

5. The method of claim 1, wherein providing, by the one or more processors, the navigation directions including the plurality of maneuvers to the user of the electronic device, further comprises providing, to the user, a message from the third party providing the request for the selected point of interest.

6. The method of claim 5, wherein the message from the third party includes one or more of an image associated with the third party, a video associated with the third party, a sound associated with the third party, or a phrase associated with the third party.

7. The method of claim 1, wherein identifying a plurality of points of interest near a location corresponding to one of the plurality of maneuvers further comprises:
  accessing a point of interest database including point of interest location data;
  calculating a distance between a location of each point of interest from the point of interest database and the location of the maneuver; and
  identifying a plurality of points of interest within a threshold distance of the location of the maneuver.

8. The method of claim 1, wherein identifying a plurality of points of interest near a location corresponding to one of the plurality of maneuvers further comprises analyzing image data associated with the location corresponding to the maneuver to identify a plurality of points of interest near the location corresponding to the maneuver.

9. The method of claim 1, wherein identifying a plurality of points of interest near a location corresponding to one of the plurality of maneuvers includes identifying a plurality of points of interest near an intersection for the maneuver.

10. A server device comprising: one or more processors and a non-transitory computer-readable memory storing thereon instructions that, when executed by the one or more processors, cause the server device to:
  generate navigation directions for a user of a client device, the navigation directions including a plurality of maneuvers;
  identify a plurality of points of interest near a location corresponding to one of the plurality of maneuvers;
  receive requests from a plurality of third parties, each request related to a respective one of the plurality of points of interest;
  select a point of interest from among the plurality of points of interest near the location corresponding to the maneuver using:
    the requests from the plurality of third parties; and
    at least one of: a visibility of each of the points of interest from the location of the maneuver, or a distance between a location of each of the points of interest and the location of the maneuver; and
  provide the navigation directions including the plurality of maneuvers to the client device, the maneuver of the plurality of maneuvers including an indication of the selected point of interest.

11. The server device of claim 10, wherein the plurality of third parties includes a first requestor that provides a request related to a first point of interest from among the plurality of points of interest, and a second requestor that provides a request related to a second point of interest from among the plurality of points of interest, and wherein to select the point of interest from among the plurality of points of interest, the instructions cause the server device to:
  compare a first bid amount made by the first requestor and a second bid amount made by the second requestor; and
  select one of the first requestor and the second requestor based on the first and second bid amounts.

12. The server device of claim 10, wherein the instructions further cause the server device to:
  for each of the plurality of maneuvers, identify a plurality of points of interest near a location corresponding to the maneuver and select a point of interest from among the plurality of points of interest;
  determine whether the navigation directions include a threshold number of selected points of interest; and
  when the navigation directions include the threshold number of selected points of interest, not include another indication of a selected point of interest in the navigation directions.

13. The server device of claim 10, wherein to provide the navigation directions to the client device, the instructions cause the server device to provide, to the user, a message from the third party that owns the selected point of interest.

14. The server device of claim 10, wherein the message from the third party includes one or more of an image associated with the third party, a video associated with the third party, a sound associated with the third party, or a phrase associated with the third party.

15. The server device of claim 10, wherein to identify a plurality of points of interest near a location corresponding to one of the plurality of maneuvers, the instructions cause the server device to:
  access a point of interest database including point of interest location data; and
  calculate a distance between a location of each point of interest from the point of interest database and the location of the maneuver; and
  identify a plurality of points of interest within a threshold distance of the location of the maneuver.

16. The server device of claim 10, wherein to identify a plurality of points of interest near a location corresponding to one of the plurality of maneuvers, the instructions cause the server device to analyze image data associated with the location corresponding to the maneuver to identify a plurality of points of interest near the location corresponding to the maneuver.

17. A non-transitory computer-readable medium storing instructions for selecting a point of interest to include in a maneuver that, when executed by one or more processors in a computing device, cause the one or more processors to:
generate navigation directions for a user of a client device, the navigation directions including a plurality of maneuvers;
identify a plurality of points of interest near a location corresponding to one of the plurality of maneuvers;
receive requests from a plurality of third parties, each request related to a respective one of the plurality of points of interest;
select a point of interest from among the plurality of points of interest near the location corresponding to the maneuver using:
the requests from the plurality of third parties; and
at least one of: a visibility of each of the points of interest from the location of the maneuver, or a distance between a location of each of the points of interest and the location of the maneuver; and
provide the navigation directions including the plurality of maneuvers to the client device, the maneuver of the plurality of maneuvers including an indication of the selected point of interest.

18. The computer-readable medium of claim 17, wherein the plurality of third parties includes a first requestor that provides a request related to a first point of interest from among the plurality of points of interest, and a second requestor that provides a request related to a second point of interest from among the plurality of points of interest, and to select the point of interest from among the plurality of points of interest, the instructions cause the one or more processors to:
compare a first bid amount made by the first requestor and a second bid amount made by the second requestor; and
select one of the first requestor and the second requestor based on the first and second bid amounts.

19. The computer-readable medium of claim 17, wherein the instructions further cause the one or more processors to:
for each of the plurality of maneuvers, identify a plurality of points of interest near a location corresponding to the maneuver and selecting a point of interest from among the plurality of points of interest;
determine whether the navigation directions include a threshold number of selected points of interest; and
when the navigation directions include the threshold number of selected points of interest, not include another indication of a selected point of interest in the navigation directions.

20. The computer-readable medium of claim 17, wherein the plurality of points of interest are a plurality of first points of interest and the instructions further cause the one or more processors to:
identify a plurality of second points of interest near a location on a route corresponding to the navigation directions that is in between two of the plurality of maneuvers;
select a second point of interest of the plurality of second points of interest; and provide the navigation directions including an indication of the selected second point of interest.

* * * * *